A. PRIESTMAN.
APPARATUS FOR ELEVATING LIQUIDS.
APPLICATION FILED JULY 17, 1913.
1,102,684.
Patented July 7, 1914.
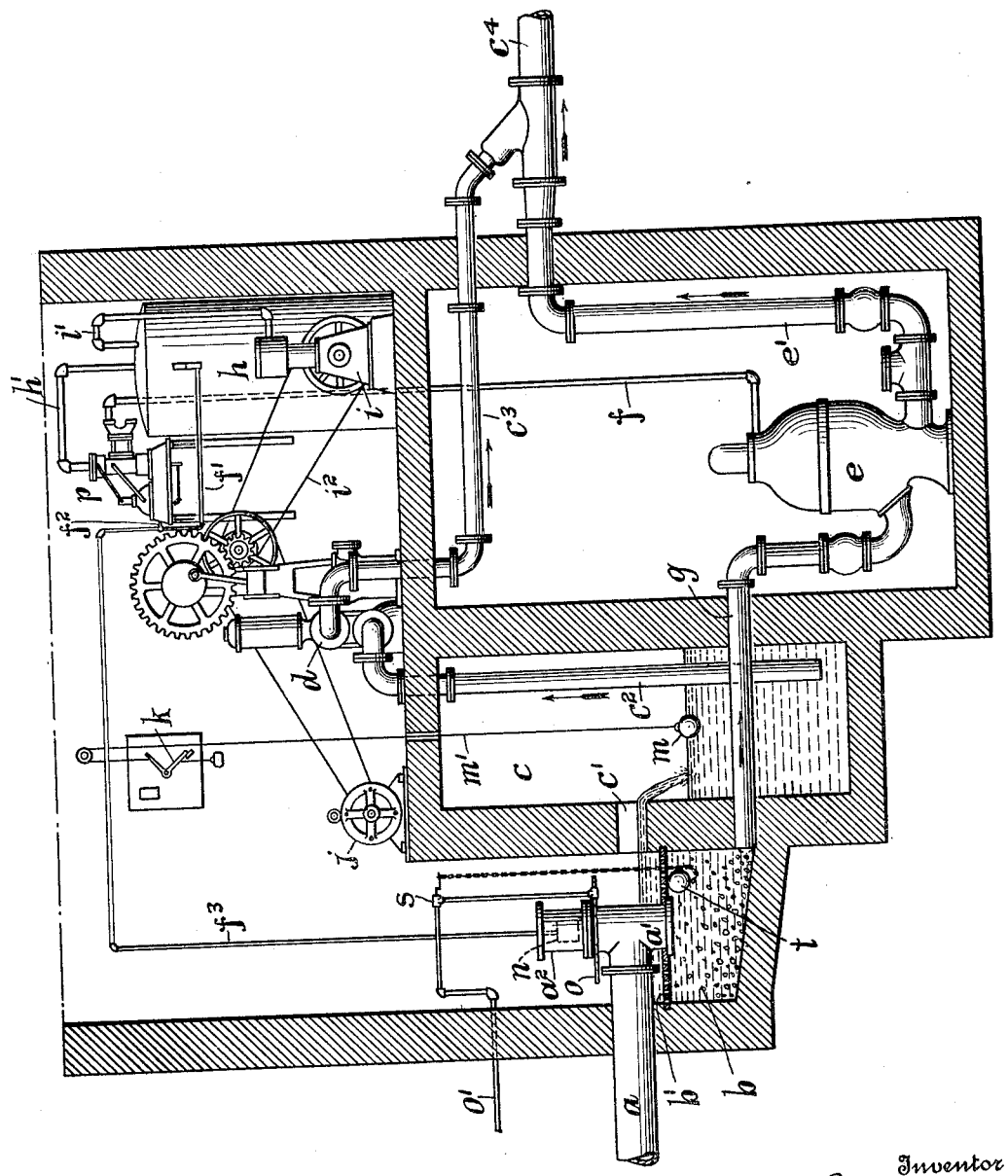

UNITED STATES PATENT OFFICE.

ALBERT PRIESTMAN, OF NEW YORK, N. Y.

APPARATUS FOR ELEVATING LIQUIDS.

1,102,684.

Specification of Letters Patent.

Patented July 7, 1914.

Original application filed April 27, 1912, Serial No. 693,691. Divided and this application filed July 17, 1913. Serial No. 779,411.

*To all whom it may concern:*

Be it known that I, ALBERT PRIESTMAN, a subject of the King of England, and a resident of the borough of Manhattan, city and county of New York, State of New York, have invented an Improvement in Apparatus for Elevating Liquids, of which the following is a specification.

It is the object of my invention to enable sewage, and like fluids containing solid matter in suspension, to be lifted more economically and efficiently than has heretofore been possible. On the one hand, the costs of installation, up-keep and operation must be considered, on the other, deterioration, and operative efficiency.

A system that may operate at a higher hydro-dynamic efficiency, though of greater cost of installation, may be wholly unsatisfactory and uneconomical because of deterioration and lack of operative efficiency. The greatest difficulty met in systems of elevating sewage is the presence, in such large quantity, of solid matter in suspension, which must pass through the lifting apparatus. This solid matter, if permitted to collect within the lifting devices, will increase the wear and tear and cause frequent stoppages, thereby reducing the efficiency and necessitating constant manual attention with the additional cost incident thereto. The liquid portion of sewage, which constitutes by far the greater part, may be lifted with the greatest efficiency and economy by a pump, but the solids, if passed through the pump, will quickly collect therein and render it inefficient. The sewage may be lifted by air pressure from an ejector without bringing any of the solid matter in contact with the valves, or operative parts, but such systems do not have the best economical quality, because of the large amount of liquid which must be handled.

In carrying out my invention I first separate the greater part of the solid matter from the liquid, and then separately discharge the sludge and separated liquid to the desired level. This enables me to use an ordinary pump for raising and discharging the liquid, and an ejector operated by air pressure or other means for raising and discharging the sludge, or separated solid matter. The operation of the pump may be controlled automatically by the level of the separated liquid, and this means may also be employed for admitting air to the ejector to discharge the sludge therefrom.

The invention also includes devices for effectively separating the liquid from the sludge and separately discharging them to their respective lifting devices, and means for preventing the clogging of the separating screen by the lodgment of solid matter therein, and for controlling the operation of the ejector independently of the accumulation of the liquid separated from the sludge.

The drawing shows a diagrammatic arrangement of an apparatus for raising sewage embodying the invention.

The sewage enters by the inlet pipe $a$ and is discharged through the outlet $a'$ into a well $b$, preferably below a screen $b'$. While I have shown a comparatively small well $b$, it is to be understood that it may be enlarged to any extent necessary to effect the desired separation in the sewage supplied. Above the screen $b'$ is a passageway $c'$ into a well $c$ from the bottom of which a suction pipe $c^2$ leads to a circulating pump $d$, from which the discharge pipe $c^3$ leads to the main $c^4$. From the bottom of the chamber $b$ a pipe $g$ leads to an ejector $e$, which, as shown, is operated by compressed air, and from which the discharge pipe $e'$ leads to the main $c^4$.

I have shown an ejecting apparatus of the character shown and described in Letters Patent 979,698, dated December 27, 1910, to Albert Priestman and Edward C. Moore, in which the contents of the vessel $e$ are discharged intermittently by measured charges of compressed air admitted to the vessel $e$ through an air-pipe $f$ under the control of valve devices $p$. In the apparatus shown in that patent the valve devices $p$ are controlled by air pressure through a pipe leading from the vessel $e$, but in the present instance they are controlled by air pressure through a pipe $f'$, leading from the air tank $h$ and having a connection $f^2$ with the valve devices for controlling their operation in the manner described in said patent. The particular character of the valve devices or means for controlling the supply of air to the ejector $e$ is not, however, material to the present invention. The compressed air which is admitted to the ejector $e$ under the control of the valve device $p$ is supplied by a pipe $h'$ from the air tank $h$.

$i$ is an air compressor by which air under compression is accumulated in the tank $h$ through the pipe $i'$. As shown the compressor $i$ is driven from the pump $d$ by a belt $i^2$.

$j$ is an electrically driven motor belted to the pump $d$ and controlled by the switch $k$.

$m$ is a float in the well $c$ having an operating connection $m'$ with the switch $k$.

$n$ is an air-bell in an upper extension $a^2$ of the supply pipe $a$ and is connected by an air pipe $f^3$ with the valve device $p$.

$o$ is a spray pipe in the chamber $b$ above the screen $b'$ supplied by a pipe $o'$ and controlled by a valve $s$ which is operated by a float $t$ in the chamber $b$.

The operation of this apparatus is as follows: The sewage enters the chamber $b'$ through the inlet $a'$ below the screen $b'$. The solid matter falls to the bottom, and the liquid, strained by the screen $b'$, passes through the opening $c'$ into the well $c$. When the liquid in the well $c$ has attained a predetermined level it lifts the float $m$ and closes the switch $k$ putting the motor $j$ into operation to drive the pump $d$ and air compressor $i$.

The pump $d$ removes the liquid from the well $c$ and discharges it through the pipe $c^3$ to the main $c^4$ or elsewhere, until the level of the liquid in $c$ is again lowered to an extent sufficient for the float $m$ to open the switch $k$ and stop the motor. Meanwhile the compressor $i$ has been accumulating pressure in the tank $h$, and when a predetermined pressure is attained a small portion of air is discharged through the pipe $f'$ to the valve devices $p$, actuating them to open and admit a charge of compressed air to the ejector $e$ to discharge the sludge which has gravitated therein through the pipe $g$ from the chamber $b$. As soon as the contents of the chamber $b$ have fallen to a sufficient extent to operate the float $t$, i. e. below the screen $b'$, the valve $s$ is opened and water is thrown by the spray-pipe $o$ upon the screen $b'$ to clean it. If the screen $b'$ should become clogged the sewage will rise in the extension $a^3$ and force air through the bell $n$ and pipe $f^3$ to actuate the valve $p$ and admit a charge of air to the ejector $e$ and thus discharge the contents of the chamber $b$ and permit the screen to be washed irrespective of the level of the liquid in the well $c$.

In this application I do not claim the process of elevating liquids herein described, as that forms the subject-matter of my application Ser. No. 693,691, filed April 27, 1912, of which the present application is a division. It is to be understood also that in speaking of "sludge" and "liquid" I do not mean that all liquid is to be separated from the solid matter, or that a perfect and complete separation must take place. In actual operation a quantity of liquid will remain with the solids and pass through the ejector or solids-elevating apparatus, but the object is to remove the greater part of the solids from the liquid, so that the liquid may pass through a pump or equivalent liquid-elevating apparatus, with as little fouling of the working parts as possible.

What I claim is as follows:

1. In apparatus for elevating sewage and like fluids containing solid matter in suspension, the combination of a well to receive the sewage, a second well having communication with the upper part of the first well to receive the liquid from the top of the sewage therein, a receptacle having communication with the bottom of the first well to receive the sludge therefrom, means to withdraw the liquids from the second well, and means to discharge the sludge from the sludge receptacle.

2. In apparatus for elevating sewage and like fluids containing solid matter in suspension, the combination of a well to receive the sewage, a second well having communication with the upper part of the first well to receive the liquid from the top of the sewage therein, a receptacle having communication with the bottom of the first well to receive the sludge therefrom, means to withdraw the liquids from the second well, means to discharge the sludge from the sludge receptacle, and a main placed at a higher level, into which the liquids and sludge are discharged.

3. In apparatus for elevating sewage and like fluids containing solid matter in suspension, the combination of a well to receive the sewage, a second well having communication with the upper part of the first well to receive the liquid from the top of the sewage therein, a receptacle having communication with the bottom of the first well to receive the sludge therefrom, means to withdraw the liquids from the second well controlled by the level of the liquid therein, and means to discharge the sludge from the sludge receptacle.

4. In apparatus for elevating sewage and like fluids containing solid matter in suspension, the combination of a well to receive the sewage, a screen in said well, an inlet pipe for sewage leading to said well below the screen, a second well communicating with the first well above the screen, means to withdraw the liquid from said second well, a receptacle communicating with the first well below the screen, and means to discharge the contents of said receptacle.

5. In apparatus for elevating sewage and like fluids containing solid matter in suspension, the combination of a well to receive the sewage, a screen in said well, an inlet pipe for sewage leading to said well below the screen, a second well communicating with the first well above the screen, a pump to withdraw the liquid from said second well, a receptacle communicating with the first well below the screen, and means to discharge the contents of said receptacle.

6. In apparatus for elevating sewage and like fluids containing solid matter in suspension, the combination of a well to receive the sewage, a screen in said well, an inlet pipe for sewage leading to said well below the screen, a second well communicating with the first well above the screen, means to withdraw the liquid from said second well, a receptacle communicating with the first well below the screen, and an air-ejector to discharge the contents of said receptacle.

7. In apparatus for elevating sewage and like fluids containing solid matter in suspension, the combination of a well to receive the sewage, a screen in said well, an inlet pipe for sewage leading to said well below the screen, a second well communicating with the first well above the screen, means to withdraw the liquid from said second well, a receptacle communicating with the first well below the screen, and means to discharge the contents of said receptacle, washing devices to supply water to the screen after the contents of the first well are wholly or partially discharged.

8. In apparatus for elevating sewage and like fluids containing solid matter in suspension, the combination of a well to receive the sewage, a screen in said well, an inlet pipe for sewage leading to said well below the screen, a second well communicating with the first well above the screen, means to withdraw the liquid from said second well, a receptacle communicating with the first well below the screen, and means to discharge the contents of said receptacle, washing devices to supply water to the screen after the contents of the first well are wholly or partially discharged controlled by the level of the sewage in said first well.

9. In apparatus for elevating sewage and like fluids containing solid matter in suspension, the combination of a well to receive the sewage, a screen in said well, an inlet pipe for sewage leading to said well below the screen, a second well communicating with the first well above the screen, means controlled by the level of the liquid in said second well to withdraw the contents thereof, and means to discharge the contents of the first well from below the screen.

10. In apparatus for elevating sewage and like fluids containing solid matter in suspension, the combination of a well to receive the sewage, a screen in said well, an inlet pipe for sewage leading to said well below the screen, a second well communicating with the first well above the screen, a pump for pumping the contents from said second well, a float in said second well for controlling the operation of said pump, and means for independently discharging the sludge from the first well from below the screen.

11. In apparatus for elevating sewage and like fluids containing solid matter in suspension, the combination of a well to receive the sewage, means for withdrawing the liquid from the upper part of said well, an ejector connected with the lower part of said well, an air pressure pipe leading to said ejector to supply air thereto for the purpose of ejecting its contents, and means to control the supply of air to said air-pipe controlled by the level of the liquid.

12. In apparatus for elevating sewage and like fluids containing solid matter in suspension, the combination of a well to receive the sewage, means for withdrawing the liquid from the upper part of said well, an ejector connected with the lower part of said well, an air pressure pipe leading to said ejector to supply air thereto for the purpose of ejecting its contents, and means to control the supply of air to said air-pipe controlled by the level of the liquid discharged from the upper part of the first well.

13. In apparatus for elevating sewage and like fluids containing solid matter in suspension, the combination of a well to receive the sewage, means for withdrawing the liquid from the upper part of said well, an ejector connected with the lower part of said well, an air pressure pipe leading to said ejector to supply air thereto for the purpose of ejecting its contents, and means to control the supply of air to said air-pipe controlled by the level of the sewage supplied to the first well.

14. In apparatus for elevating sewage and like fluids containing solid matter in suspension, the combination of a well to receive the sewage, means for withdrawing the liquid from the upper part of said well, an ejector connected with the lower part of said well, an air pressure pipe leading to said ejector to supply air thereto for the purpose of ejecting its contents, and means to control the supply of air to said air-pipe controlled both by the level of the liquid discharged from the upper part of the first well and also by the level of the sewage supplied to the first well.

15. In apparatus for elevating sewage and like fluids containing solid matter in suspension, the combination of a well to receive the sewage, means for separating the liquid from the sludge at said well, an air actuated ejector for receiving the sludge and discharging it by air pressure, a pump for pumping the separated liquids, and means controlled by the level of the separated liquids for controlling the operation of the pump and ejector.

16. In apparatus for elevating sewage and like fluids containing solid matter in suspension, the combination of a well to receive the sewage, means for separating the liquid from the sludge at said well, an air actuated ejector for receiving the sludge and discharging it by air pressure, a pump for pumping the separated liquids, means controlled by the level of the separated liquids for controlling the operation of the pump and ejector, and means controlled by the level of the sewage in the well for also controlling the operation of the ejector.

17. In apparatus for elevating sewage and like fluids containing solid matter in suspension, the combination of a well to receive the sewage, means for separating the liquid from the sludge at said well, an air actuated ejector for receiving the sludge, a reservoir containing compressed air, a pressure pipe leading from said reservoir to the ejector, an automatically controlled valve in said pipe, and means for separately removing the separated liquid.

18. In apparatus for elevating sewage and like fluids containing solid matter in suspension, the combination of a well to receive the sewage, means for separating the liquid from the sludge at said well, an air actuated ejector for receiving the sludge, a reservoir containing compressed air, a pressure pipe leading from said reservoir to the ejector, a valve in said pipe, means for separately removing the separated liquid, and means controlled by the level of the separated liquid to control said valve in the air pipe.

19. In apparatus for elevating sewage and like fluids containing solid matter in suspension, the combination of a well to receive the sewage, means for separating the liquid from the sludge at said well, an air actuated ejector for receiving the sludge, a reservoir containing compressed air, a pressure pipe leading from said reservoir to the ejector, a valve in said pipe, means for separately removing the separated liquid, means controlled by the level of the separated liquid to control said valve in the air pipe, and means controlled by the level of the sewage in the well to also control said valve.

20. In apparatus for elevating sewage and like fluids containing solid matter in suspension, the combination of a well to receive the sewage, a second well receiving liquid from the upper part of the first well, an air actuated ejector receiving the sludge from the bottom of the first well, a reservoir containing compressed air, a pipe leading from said air reservoir to the ejector, an automatic valve in said air pipe, a pump for pumping the liquid from the second well, an air compressor connected with the air reservoir and operated by said pump, and means controlled by the level of the liquid in the second well for controlling the operation of said pump.

21. In apparatus for elevating sewage and like fluids containing solid matter in suspension, the combination of a well to receive the sewage, a second well receiving liquid from the upper part of the first well, an air actuated ejector receiving the sludge from the bottom of the first well, a reservoir containing compressed air, a pipe leading from said air reservoir to the ejector, an automatic valve in said air pipe, a pump for pumping the liquid from the second well, an air compressor connected with the air reservoir and operated by said pump, means controlled by the level of the liquid in the second well for controlling the operation of said pump, and means controlled by the level of the sewage at the first well for independently controlling the valve in the air-pipe.

In testimony of which invention, I hereunto set my hand.

ALBERT PRIESTMAN.

Witnesses:
ERNEST HOWARD HUNTER,
R. M. KELLY.

Copies of this patent may be obtained for five cents each, by addressing the "Commissioner of Patents, Washington, D. C."